United States Patent [19]

Engelhard et al.

[11] 4,227,993

[45] Oct. 14, 1980

[54] CATALYSTS FOR THE HYDROTREATMENT OF HYDROCARBONS AND THEIR UTILIZATION

[75] Inventors: Philippe Engelhard; Georges Szabo; Joseph E. Weisang, all of Le Havre, France

[73] Assignee: Compagnie Francaise de Raffinage, Paris, France

[21] Appl. No.: 18,070

[22] Filed: Mar. 6, 1979

Related U.S. Application Data

[62] Division of Ser. No. 758,670, Jan. 12, 1977, abandoned, which is a division of Ser. No. 597,987, Jul. 22, 1975, Pat. No. 4,039,477.

[30] Foreign Application Priority Data

Jul. 30, 1974 [FR] France ................................ 74 26490

[51] Int. Cl.$^3$ ............................................. C10G 35/08
[52] U.S. Cl. ................................... 208/139; 585/480; 585/669; 585/747
[58] Field of Search ................ 208/139; 585/480, 669, 585/747, 477

[56] References Cited

U.S. PATENT DOCUMENTS

| 3,207,808 | 9/1965 | Bajers | 252/441 |
|---|---|---|---|
| 3,402,210 | 9/1968 | Hiser | 252/466 PT |
| 3,661,768 | 5/1972 | Davis et al. | 208/139 |
| 3,686,340 | 8/1972 | Patrick et al. | 208/138 |
| 3,694,348 | 9/1972 | Bursian et al. | 208/138 |
| 3,700,588 | 10/1972 | Weisang et al. | 208/139 |
| 3,776,860 | 12/1973 | Rai | 252/466 PT |
| 3,788,977 | 1/1974 | Dolbear et al. | 208/139 |
| 3,852,215 | 12/1974 | Duhart et al. | 208/139 |
| 3,894,110 | 7/1975 | Drehman | 252/466 PT |
| 3,915,845 | 10/1975 | Antos | 208/139 |

*Primary Examiner*—C. Davis
*Attorney, Agent, or Firm*—Curtis, Morris & Safford

[57] ABSTRACT

Catalysts particularly useful for hydroreforming and isomerization of hydrocarbons formed of a refractory mineral oxide carrier having a halogen in combined form and the following metals in free or combined state:
(a) A metal from the platinum group (0.02 to 2%);
(b) tin (0.02 to 2%); and
(c) at least one metal selected from the group of scandium, yttrium, thorium, uranium, and the rare earths metals (0.01 to 5%)—said percentages being based upon the total weight of the catalyst, said catalyst preferably having platinum and chlorine. Also the use of said catalyst in the aforementioned hydrotreatments.

12 Claims, No Drawings

CATALYSTS FOR THE HYDROTREATMENT OF HYDROCARBONS AND THEIR UTILIZATION

This is a division of application Ser. No. 758,670, filed Jan. 12, 1977 and now abandoned, which in turn is a division of application Ser. No. 597,987 filed July 22, 1975 and now U.S. Pat. No. 4,039,477.

The present invention relates to new catalysts for the hydrotreatment of hydrocarbons. More particularly, it relates to their utilization in the hydroreforming and isomerization of hydrocarbons.

Catalytic hydrotreating processes are treatments applied to hydrocarbon charges in the presence of hydrogen and of a catalyst which entail, separately or simultaneously, hydrogenation, dehydrogenation, isomerization, cyclization, dehydrocyclization and aromatization reactions.

An example of a process in which these reactions occur simultaneously is catalytic hydroreforming, a process that is employed particularly in the treatment of petroleum fractions intended for the production of gasolines for the purpose of raising the octane rating of these fractions. In this process it is sought to promote the dehydrocyclization reactions which convert paraffins and naphthenes to high-octane aromatic hydrocarbons. This process has come into wide use on account of the current demand for gasoline as engine fuel. Moreover, the current trend toward reduction of atmospheric pollution by automotive vehicles calls for the production of gasolines which may be used directly, without tetraethyllead being added for the purpose of raising the octane rating.

In catalytic hydroreforming, the conditions of treatment are selected so that cracking reactions are minimized and dehydrocylization, dehydrogenation and isomerization promoted.

These conditions generally are as follows: Temperature ranges approximately from 450° to 550° C. Total relative pressure ranges approximately from 10 to 40 bars. The space velocity per hour of the charge of hydrocarbons (usually naphtha), measured in the liquid state, is in the neighborhood of 1 to 2 and generally is comprised between 0.5 and 5. Moreover, the operation is carried out in the presence of hydrogen, the molar ratio of hydrogen to hydrocarbons being comprised between 2 and 10.

Particularly when paraffins and naphthenes are used as starting materials, the dehydrocyclization and dehydrogenation reactions result in the formation of aromatic hydrocarbons which, apart from being of interest as fuels by reason of their high octane rating, are also suited for use as raw materials in the petrochemical industry.

Another example of a catalytic hydrotreating process is the process for isomerization of hydrocarbons. This process may be applied particularly to saturated aliphatics, olefinic or aromatic hydrocarbons. In the case of aromatic hydrocarbons, for example, it may be employed to increase the yield of paraxylene, which is a particularly useful raw material in the manufacture of polyesters.

The isomerization of alkylaromatic hydrocarbons is an operation that is carried out at a temperature slightly below the temperature employed in hydroreforming— generally below 500° C. and above 350° C.—for example, between 430° and 480° C.—and at a pressure on the order of 25 to 35 bars. The space velocity per hour of the hydrocarbon charge, measured in the liquid state, generally is in the neighborhood of 1 to 2. The operation is carried out in the presence of hydrogen, the molar ratio of hydrogen to hydrocarbons varying approximately between 8 and 10.

The most widely used catalysts are those containing a platinum-group metal, usually platinum, supported on a refractory mineral oxide of large specific surface, such as alumina. The price of platinum being very high, bi- or tri-metallic catalysts have come into use which permit the amount of platinum deposited on the carrier to be reduced.

It is known that rare earths may be added to the platinum in hydrotreating catalysts. U.S. Pat. No. 3,776,860, for example, relates to catalysts containing platinum and a metal selected from the group consisting of neodymium, praseodymium, samarium and ytterbium. However, these catalysts have the drawback of promoting cracking reactions which result in the formation of light hydrocarbons detrimental to the octane rating of the effluent.

Catalysts containing tin and platinum are also known. For example, U.S. Pat. No. 3,700,588 and the addition thereto, U.S. Pat. No. 3,822,221, which are owned by the applicants' assignee, describe catalysts containing at least one element from the platinum group, for example, platinum, and possibly iridium, and at least one element from the group consisting of lead and tin.

For the isomerization of alkylaromatic hydrocarbons, a great many catalysts are known. Many of these include a porous alumina or aluminosilicate carrier in which is deposited a so-called noble metal such as platinum, whether or not associated with other metals, among them iridium, tin, rhenium, lead and germanium. It is also known that one or more "non-noble" metals may be associated on such a carrier, such as the metals of groups Ib, IIb, Vb or VIb of the periodic table of elements.

The applicants have found that the stability of catalysts containing at least one platinum-group metal and tin may be improved by the addition of a metal selected from the group consisting of scandium, yttrium, thorium, uranium and the rare earth metals.

It has further found that, surprisingly, these catalysts do not promote cracking reactions.

It is thus the object of the present invention to provide highly stable hydrotreating catalysts which result in effluents having a very good octane rating, give a better liquid-hydrocarbon yield, and possess good isomerizing properties.

The present invention has as a first preferred embodiment catalysts for the hydrotreatment of hydrocarbons comprising a refractory mineral oxide carrier and a halogen element present in combined form, said catalysts being characterized by the fact that they comprise, in combination, in free or combined form:

(a) From 0.02 to 2%, and preferably from 0.10 to 0.70%, based on the total weight of the catalyst, of at least one platinum-group metal.

(b) From 0.02 to 2%, and preferably from 0.05 to 0.60%, based on the total catalyst weight, of tin.

(c) From 0.01 to 5%, and preferably from 0.02 to 1%, based on the total catalyst weight, of at least one metal selected from the group consisting of scandium, yttrium, thorium, uranium and the rare earth metals.

In this definition of the invention and throughout the present application, the term "platinum-group metal"

means one of the following metals: Ruthenium, rhodium, palladium, osmium, iridium, and platinum.

A second preferred embodiment of the present invention are catalysts for the hydrotreatment of hydrocarbons comprising a refractory mineral oxide carrier and a halogen element present in combined form, said catalysts being characterized by the fact that they comprise, in combination, in the free or combined state:

(a) From 0.02 to 2%, and preferably from 0.10 to 0.70%, based on the total wieght of the catalyst, of at least one platinum-group metal.

(b) From 0.02 to 2%, and preferably from 0.05 to 0.60%, based on the total catalyst weight, of tin.

(c) From 0.01 to 5%, and preferably from 0.02 to 1%, based on the total catalyst weight, of at least one metal from the group consisting of yttrium, thorium, uranium, praseodymium, cerium, lanthanum, neodymium, samarium, dysprosium and gadolinium.

More particularly, the invention relates to catalysts as defined in which:

(a) The carrier has a specific surface greater than 15 $m^2$ per gram and a specific pore volume greater than 0.1 cc per gram, and (b) The halogen content, determined in the elemental form, and based on the total catalyst weight, is comprised between 0.5 and 3%, and preferably between 0.6 and 1.6%.

A third preferred embodiment of the present invention is the utilization of the catalysts defined above in the hydroreforming of a petroleum fraction containing less than 10 ppm, and preferably less than 1 ppm, of sulfur and whose boiling temperature at atmospheric pressure is comprised between 35° and 250° C.

A fourth preferred embodiment of the invention is the utilization of the catalysts in accordance with the invention in the isomerization of hydrocarbons in the presence of hydrogen.

The carriers of the catalysts in accordance with the invention should be refractory substances having an adequate surface and specific pore volume. The specific surface is comprised between 15 and 350 $m^2$/gram, and preferably between 100 and 350 $m^2$/gram, the specific pore volume being greater than 0.1 cc per gram. Moreover, the substances must have a rather pronounced acid character since it is known that the isomerization reactions occur on acid sites. Both alumina and aluminosilicates, for example, are well suited for use as such carriers.

The most advantageous carriers are those whose platinum-group metal content, based on the total catalyst weight, is comprised between 0.02 and 2%. To give satisfactory catalytic properties, said content should preferably be greater than 0.10%; however, for reasons of catalyst cost, it is preferably limited to 0.70%.

The tin content, based on the total catalyst weight, is comprised between 0.02 and 2%; since below 0.02% and above 2% the improvement in catalytic properties in relation to a catalyst containing no platinum is negligible.

The applicants have further found that the most efficacious contents are those comprised between 0.02 and 0.60%.

The same is true of the content of the metal selected from the group consisting of yttrium, thorium, uranium, samarium, dysprosium, gadolinium, praseodymium, cerium, lanthanum and neodymium, which, based on the total catalyst weight, is comprised between 0.01 and 5%, and preferably between 0.02 and 1%.

The halogen content, based on the total catalyst weight, may be comprised between 0.3 and 3%, and preferably between 0.6 and 1.6%. The halogen present in the catalysts in accordance with the invention is preferably chlorine. It may be introduced into the catalyst composition in the manner known in the field, for example, during preparation of the carrier or while the metallic elements are being deposited, by means of solutions of metal chlorides, for example.

The catalysts in accordance with the invention may be prepared by conventional carrier impregnation methods using solutions containing the elements to be deposited.

The impregnation of the carrier may be carried out (a) by means of at least one solution containing the three elements to be deposited; or (b) by means of at least two solutions, one containing two elements to be deposited, and the other the third; or (c) by means of at least three solutions, each containing one of the elements to be deposited.

The deposition of the tin may be effected from solutions of stannous chloride, stannic chloride or any other soluble tin salt, for example.

The deposition of the metal selected from the group containing yttrium, thorium, praseodymium, cerium, uranium, lanthanum, neodymium, samarium, dysprosium and gadolinium may be effected from solutions of their soluble salts, as, for example, the nitrates, the chlorides or the acetates.

The impregnating solution containing at least one metal selected from the group consisting of praseodymium, cerium, lanthanum, neodymium, samarium, dysprosium and gadolinium may be prepared from a natural mixture of these elements. Impregnation may take place before the addition, between additions or after the addition of tin and at least one of the platinum-group metals.

After the metals have been deposited, the solid obtained is calcined at a temperature which, in the case of the metals other than the platinum-group metals, is comprised between 400° and 700° C. and preferably is 600° C. or less, and which in the case of the platinum-group metals is 550° C. or less.

The acidity of the carrier may be altered prior to deposition of the elements, during such deposition, or between depositions when the latter are not simultaneous, by an acid treatment with hydrochloric acid, for example.

The catalyst may be activated during the hydrotreatment by incorporating in the charge a soluble halogenated compound (a chloride, for example). It may also be advantageous to presulfurize the catalyst with a stream of sulfurized hydrogen, for example, with a view to minimizing the cracking reactions which tend to occur at the start of the treatment.

As will be seen from the examples which follow, and which are in no wise limitative, the applicants have obtained highly interesting results with the catalysts in accordance with the invention.

Examples 1, 2 and 3 relate more particularly to the hydroreforming of a charge of normal heptane. The nature of this charge does not constitute a limitation of the field of application of said catalysts since such a charge is customarily used in performance tests on hydroreforming catalysts. The results obtained may therefore be extended to the case where the charge is a fraction intended for the manufacture of a high-octane gasoline whose boiling temperature is comprised between 35° and 250° C. and whose sulfur content is under 10 ppm, and preferably under 1 ppm.

Examples 4 and 5 relate to the isomerization of a charge consisting of ethylbenzene.

EXAMPLE 1

This example relates to the preparation of (1) a control catalyst T1 consisting of platinum and alumina;

(2) control catalysts A1, B1, C1, D1, E1, F1, G1, H1, I1, and J1 consisting of alumina, platinum and a metal selected from the group consisting of yttrium, thorium, uranium, praseodymium, cerium, lanthanum, neodymium, samarium, dysprosium, and gadolinium; and (3) catalysts A2, B2, C2, C3, D2, E2, F2, G2, H2, I2 and J2 in accordance with the invention; which are then submitted to catalytic tests consisting of the hydroreforming of normal heptane.

An alumina is used in the form of extrusions whose characteristics are as follows:

| | |
|---|---|
| Average diameter of extrusions | 1.5 mm |
| Specific surface | 190 m$^2$/g |
| Pore volume | 0.51 cc/g |
| Chlorine content (measured by x-ray fluoresence) | 0.5% by weight of the alumina |

This alumina is calcined for four hours at 600° C. and is used as the carrier for the catalysts prepared and tested in this example. It will hereinafter be referred to as the alumina carrier.

PREPARATION OF CONTROL CATALYST T1

100 g of the alumina carrier is immersed in 250 cc of an N/10 solution of hydrochloric acid. This alumina is then dewatered at ambient temperature and then contacted with a circulating solution of hexachlorplatinic acid ($H_2PtCl_6.6H_2O$) of such concentration that the final catalyst contains from 0.35 to 0.40% by weight of platinum. After dewatering followed by drying at 120° C. for 16 hours, the catalyst is calcined for 2 hours at 530° C. in a muffle kiln. The catalyst so obtained contains 0.35% by weight of platinum and 1.34% weight of chlorine.

PREPARATION OF CATALYSTS A1, B1, C1, D1, E1, F1, G1, H1, I1, AND J1

100 g of the alumina carrier is placed in a rotary evaporator with 250 cc of a solution containing 20 cc hydrochloric acid RP and a certain amount of a compound of the metal selected from the group consisting of yttrium, samarium, thorium, uranium, praseodymium, cerium, lanthanum, neodymium, dysprosium and gadolinium.

Said amount and the compound are given in Table I for every one of the catalysts prepared.

TABLE I

| CATA-LYST | Metal to be Deposited other than platinum and tin | COMPOUND | Quantity (in grams) of compound for 100 g of alumina |
|---|---|---|---|
| A1 | Praseo- | Oxide | |
| A2 | dymium | Pr$_6$O$_{11}$ | 0.2868 |
| B1 | Cerium | Nitrate | |
| B2 | | Ce(NO$_3$)$_3$ . 6 H$_2$O | 0.7318 |
| C1 | | Oxide | |
| C2 | Yttrium | Y$_2$O$_3$ | 0.1902 |

TABLE I-continued

| CATA-LYST | Metal to be Deposited other than platinum and tin | COMPOUND | Quantity (in grams) of compound for 100 g of alumina |
|---|---|---|---|
| C3 | | | |
| D1 | | Nitrate | |
| D2 | Lanthanum | La(NO$_3$)$_3$ . 6 H$_2$O | 0.7296 |
| E1 | | Oxide | |
| E2 | Neodymium | Nd$_2$O$_3$ | 0.2834 |
| F1 | | Acetate | |
| F2 | Uranium | UO$_2$(CH$_3$COO)$_2$ . 2 H$_2$O | 0.7146 |
| G1 | | Nitrate | |
| G2 | Thorium | Th(NO$_3$)$_4$ . 4 H$_2$O | 0.9300 |
| H1 | Samarium | Oxide | |
| H2 | | Sm$_2$O$_3$ | 0.2964 |
| I1 | Dyspro- | Oxide | |
| I2 | sium | Dy$_2$O$_3$ | 0.2738 |
| J1 | Gadolinium | Oxide | |
| J2 | | Gd$_2$O$_3$ | 0.3054 |

After evaporation of the liquid phase, the alumina is dried at 120° C. for 16 hours, then calcined at 500° C. for 2 hours.

The alumina is then immersed in 250 cc of an N/10 solution of hydrochloric acid which is circulated for 2 hours.

After dewatering, the alumina is immersed in 250 cc of a hexachloroplatinic acid solution containing 1.4 g per liter of platinum. This solution is circulated for 16 hours.

Following dewatering, the alumina is dried at 120° C. for 16 hours, then calcined at 530° C. for 2 hours.

The compositions of the catalysts obtained are given in Table II.

TABLE II

| | | Composition of catalyst in weight per cent | | |
|---|---|---|---|---|
| CATA-LYST | Metal other than platinum | Platinum | Metal other than platinum | Chlorine |
| A1 | Praseodymium | 0.35 | 0.06 | 1.37 |
| B1 | Cerium | 0.35 | 0.12 | 1.38 |
| C1 | Yttrium | 0.35 | 0.06 | 1.30 |
| D1 | Lanthanum | 0.35 | 0.04 | 1.32 |
| E1 | Neodymium | 0.35 | 0.06 | 1.40 |
| F1 | Uranium | 0.35 | 0.30 | 1.28 |
| G1 | Thorium | 0.35 | 0.48 | 1.37 |
| H1 | Samarium | 0.35 | 0.14 | 1.36 |
| I1 | Dysprosium | 0.35 | 0.10 | 1.43 |
| J1 | Gadolinium | 0.35 | 0.105 | 1.26 |

PREPARATION OF CATALYSTS A2, B2, C2, C3, D2, E2, F2, G2, H2, I2 AND J2

100 g of the alumina carrier is placed in a rotary evaporator with 250 cc of a solution containing 20 cc of hydrochloric acid RP and a certain amount of a compound of the metal selected from the group consisting of yttrium, thorium, uranium, praesodymium, cerium, lanthanum, neodymium, samarium, dysprosium and gadolinium.

Said amount and the compound are likewise given in Table I for every one of the catalysts prepared.

After evaporation of the liquid phase, the alumina is dried at 120° C. for 16 hours, then calcined at 600° C. for 2 hours.

The alumina is then placed in a rotary evaporator with 250 cc of a solution containing 20 cc of hydrochloric acid RP and 0.380 g of stannous chloride, $SnCl_2.2H_2O$.

After evaporation of the liquid phase, drying at 120° C. for 16 hours and calcination at 600° C. for 2 hours, the alumina is immersed in 250 cc of an N/10 solution of hydrochloric acid which is circulated for 2 hours.

After dewatering, the alumina is immersed in 250 cc of a hexachloroplatinic acid solution containing 1.4 g per liter of platinum. This solution is circulated for 16 hours.

Following dewatering, the alumina is dried at 120° C. for 16 hours, then calcined at 530° C. for 2 hours.

The compositions of the catalysts obtained are given in Table III.

TABLE III

| CATA-LYST | Metal other than platinum or tin | Composition of catalyst in wt.% | | | |
|---|---|---|---|---|---|
| | | Platinum | Metal other than platinum or tin | Tin | Chlorine |
| A2 | Praseodymium | 0.35 | 0.07 | 0.20 | 1.35 |
| B2 | Cerium | 0.35 | 0.13 | 0.20 | 1.36 |
| C2 | Yttrium | 0.35 | 0.06 | 0.20 | 1.24 |
| C3 | Yttrium | 0.35 | 0.06 | 0.20 | 1.24 |
| D2 | Lanthanum | 0.35 | 0.05 | 0.20 | 1.26 |
| E2 | Neodymium | 0.35 | 0.07 | 0.20 | 1.35 |
| F2 | Uranium | 0.35 | 0.30 | 0.20 | 1.37 |
| G2 | Thorium | 0.35 | 0.45 | 0.20 | 1.45 |
| H2 | Samarium | 0.35 | 0.16 | 0.20 | 1.26 |
| I2 | Dysprosium | 0.35 | 0.12 | 0.20 | 1.26 |
| J2 | Gadolinium | 0.35 | 0.12 | 0.20 | 1.16 |

The catalysts T1, A1, A2, B1, B2, C1, C2, C3, D1, D2, E1, E2, F1, F2, G1, G2, H1, H2, I1, I2, J1 and J2 are submitted to the following catalytic test: 2 cc of the catalyst is placed in a small reactor which is maintained at a constant temperature. That temperature is 520° C. for all tests, except for catalyst C3, for which the temperature is 460° C. A hydrogen gas stream saturated with normal heptane (by bubbling the hydrogen in the heptane at 20° C.) is passed over the catalyst at atmospheric pressure. The sulfur content of the normal heptane is less than 1 ppm. The space velocity per hour of the gas mixture (that is to say, the volume of gas passing over a unit volume of catalyst per hour) is 80.

The proportion of heptane in the gas stream is 2.5%. The reactor effluent is analyzed in the gaseous phase by chromatography.

The results obtained with the catalysts T1, A1, A2, B1, B2, C1, C2, C3, D1, D2, E1, E2, F1, F2, G1, G2, H1, H2, I1, I2, J1 and J2 are presented in Table IV.

That table gives, for each catalyst and after different operating times, the weight percent in the effluent of (a) the hydrocarbons with four or fewer carbon atoms ($C_1$ to $C_4$), this value being representative of the cracking of the charge;

(b) the normal heptane, ($nC_7$), the complement to 100 being a measure of the conversion of the charge;

(c) the hydrocarbons with five or more carbon atoms other than the unconverted normal heptane ($C_5+$); and (d) the aromatic hydrocarbons (benzene and toluene), this value being particularly representative of the activity of the catalysts for the hydroreforming of hydrocarbons, aromatic hydrocarbons having a high octane rating.

TABLE IV

| CATA-LYST | Characteristic values of effluent (wt. % of charge) | Operating times (hours) | | | | |
|---|---|---|---|---|---|---|
| | | ¼ | 1 | 3 | 5 | 7½ |
| T1 | $C_1$-$C_4$ | 63 | 54.8 | 44.6 | 44.3 | 38.9 |
| | n $C_7$ | — | 0.2 | 2.3 | 6.9 | 11.2 |
| | $C^+_5$ (other than n $C_7$) | 0.1 | 1.1 | 4.1 | 6.0 | 6.1 |
| | Aromatics (benzene + toluene) | 36.8 | 43.9 | 49.0 | 42.8 | 43.8 |
| A1 | $C_1$-$C_4$ | 64.4 | 54.1 | 51.3 | 52.1 | — |
| | n $C_7$ | — | — | 0.4 | 1.4 | — |
| | $C^+_5$ (other than n $C_7$) | — | 0.9 | 3.1 | 5.3 | — |
| | Aromatics (benzene + toluene) | 35.6 | 45.0 | 45.2 | 41.2 | — |
| A2 | $C_1$-$C_4$ | 23.5 | 16.7 | 10.8 | 14.4 | 14.6 |
| | n $C_7$ | — | — | — | — | — |
| | $C^+_5$ (other than n $C_7$) | 1.7 | 2.2 | 2.9 | 2.7 | 2.7 |
| | Aromatics (benzene + toluene) | 74.8 | 81.1 | 86.3 | 82.9 | 82.7 |
| B1 | $C_1$-$C_4$ | 53.6 | 43.9 | 39.8 | 44.9 | — |
| | n $C_7$ | — | — | 0.3 | 0.3 | — |
| | $C^+_5$ (other than n $C_7$) | 0.9 | 4.3 | 10.4 | 13.0 | — |
| | Aromatics (benzene + toluene) | 45.5 | 51.8 | 49.5 | 41.8 | — |
| B2 | $C_1$-$C_4$ | 13.1 | 11.2 | 10.7 | 10.5 | — |
| | n $C_7$ | — | — | — | — | — |
| | $C^+_5$ (other than n $C_7$) | 0.8 | 1.1 | 1.6 | 1.5 | — |
| | Aromatics (benzene + toluene) | 86.1 | 87.7 | 87.7 | 88.0 | — |
| C1 | $C_1$-$C_4$ | 62.2 | 46.4 | 43.8 | 42.5 | — |
| | n $C_7$ | — | 1.5 | 2.9 | 6.6 | — |
| | $C^+_5$ (other than n $C_7$) | 1.1 | 5.1 | 8.6 | 10.7 | — |
| | Aromatics (benzene + toluene) | 36.7 | 47.0 | 44.7 | 40.2 | — |
| C2 | $C_1$-$C_4$ | 15.8 | 10.8 | 9.1 | 9.3 | 9.9 |
| | n $C_7$ | — | — | — | — | — |
| | $C^+_5$ (other than n $C_7$) | 1.2 | 1.4 | 1.8 | 1.8 | 1.9 |
| | Aromatics (benzene + toluene) | 83.0 | 87.8 | 89.1 | 88.9 | 88.2 |
| C3 | $C_1$-$C_4$ | 23.7 | 22.7 | 23.2 | 24.5 | 24.5 |
| | n $C_7$ | — | — | 0.5 | 0.4 | 1.0 |
| | $C^+_5$ (other than n $C_7$) | 6.7 | 7.4 | 9.2 | 10.0 | 11.2 |
| | Aromatics (benzene + toluene) | 69.6 | 69.9 | 67.1 | 65.1 | 63.3 |
| D1 | $C_1$-$C_4$ | 56.9 | 45.7 | 47.8 | 46.2 | — |
| | n $C_7$ | 0.4 | 0.9 | 2.1 | 3.5 | — |
| | $C^+_5$ (other than n $C_7$) | 1.2 | 3.7 | 6.0 | 9.3 | — |
| | Aromatics (benzene + toluene) | 41.5 | 49.7 | 44.1 | 41.0 | — |
| D2 | $C_1$-$C_4$ | 21.1 | 15.6 | 13.7 | 14.9 | 12.2 |
| | n $C_7$ | — | — | — | 0.3 | 0.7 |
| | $C^+_5$ (other than n $C_7$) | 2.7 | 3.4 | 3.3 | 3.8 | 3.9 |
| | Aromatics (benzene + toluene) | 76.2 | 81.0 | 83.0 | 81.0 | 83.2 |
| E1 | $C_1$-$C_4$ | 52.0 | 49.4 | 49.0 | 49.2 | — |
| | n $C_7$ | — | — | 0.4 | 1.1 | — |
| | $C^+_5$ (other than n $C_7$) | — | 1.3 | 4.7 | 6.8 | — |
| | Aromatics (benzene + toluene) | 48.0 | 49.3 | 45.9 | 42.9 | — |

TABLE IV-continued

| CATA-LYST | Characteristic values of effluent (wt. % of charge) | Operating times (hours) | | | | |
|---|---|---|---|---|---|---|
| | | ¼ | 1 | 3 | 5 | 7½ |
| E2 | $C_1$-$C_4$ | 16.2 | 13.5 | 13.8 | 11.3 | 11.4 |
| | n $C_7$ | — | — | — | — | — |
| | $C^+_5$ (other than n $C_7$) | 0.4 | 1.2 | 1.7 | 2.2 | 1.8 |
| | Aromatics (benzene + toluene) | 83.4 | 85.3 | 84.5 | 86.5 | 86.8 |
| F1 | $C_1$-$C_4$ | 57.0 | 45.2 | 45.2 | 44.4 | — |
| | n $C_7$ | — | — | 0.6 | 1.2 | — |
| | $C^+_5$ (other than n $C_7$) | 0.4 | 2.3 | 5.8 | 7.6 | — |
| | Aromatics (benzene + toluene) | 42.6 | 52.5 | 48.4 | 46.8 | — |
| F2 | $C_1$-$C_4$ | 16.2 | 11.5 | 11.1 | 10.1 | — |
| | n $C_7$ | — | — | — | — | — |
| | $C^+_5$ (other than n $C_7$) | 0.5 | 1.4 | 1.6 | 1.6 | — |
| | Aromatics (benzene + toluene) | 83.3 | 87.1 | 87.3 | 88.3 | — |
| G1 | $C_1$-$C_4$ | 50.7 | 48.1 | 46.2 | 46.0 | — |
| | n $C_7$ | — | 0.4 | 1.3 | 2.9 | — |
| | $C^+_5$ (other than n $C_7$) | 0.6 | 2.8 | 5.6 | 8.1 | — |
| | Aromatics (benzene + toluene) | 48.7 | 48.7 | 46.9 | 43.0 | — |
| G2 | $C_1$-$C_4$ | 16.3 | 13.4 | 11.1 | 11.3 | 10.4 |
| | n $C_7$ | — | — | — | — | — |
| | $C^+_5$ (other than n $C_7$) | 0.5 | 1.1 | 1.6 | 1.7 | 2.1 |
| | Aromatics (benzene + toluene) | 83.2 | 85.5 | 87.3 | 87.0 | 87.5 |
| H1 | $C_1$-$C_4$ | 33.2 | 28.7 | 33.4 | 35.4 | 36.3 |
| | n $C_7$ | — | 2.2 | 2.6 | 3.8 | 4.0 |
| | $C^+_5$ (other than $C_7$) | 4.4 | 6.2 | 7.1 | 8.0 | 8.2 |
| | Aromatics (benzene + toluene) | 62.4 | 62.9 | 56.9 | 52.8 | 51.5 |
| H2 | $C_1$-$C_4$ | 13.3 | 10.7 | 11.0 | 11.1 | 10.6 |
| | n $C_7$ | — | — | 0.1 | 0.4 | 0.4 |
| | $C^+_5$ (other than n $C_7$) | 1.8 | 2.1 | 2.4 | 2.5 | 2.5 |
| | Aromatics (benzene + toluene) | 84.9 | 87.2 | 86.5 | 86.0 | 86.5 |
| I1 | $C_1$-$C_4$ | 49.4 | 41.3 | 39.6 | 38.1 | 44.3 |
| | n $C_7$ | — | — | — | — | — |
| | $C^+_5$ (other than n $C_7$) | — | — | 0.1 | 0.6 | 1.0 |
| | Aromatics (benzene + toluene) | 50.6 | 58.7 | 60.3 | 61.3 | 54.7 |
| I2 | $C_1$-$C_4$ | 16.9 | 13.9 | 12.0 | 10.8 | 12.1 |
| | n $C_7$ | — | — | — | — | — |
| | $C^+_5$ (other than n $C_7$) | 1.6 | 2.5 | 2.6 | 2.0 | 2.6 |
| | Aromatics (benzene + toluene) | 81.5 | 83.6 | 85.4 | 87.2 | 85.3 |
| J1 | $C_1$-$C_4$ | 36.7 | 29.2 | 32.8 | 31.9 | 34.2 |
| | n $C_7$ | 4.9 | 9.3 | 15.7 | 22.4 | 23.3 |
| | $C^+_5$ (other than n $C_7$) | 6.4 | 8.6 | 9.4 | 10.1 | 10.3 |
| | Aromatics (benzene + toluene) | 52.0 | 52.9 | 42.1 | 35.6 | 32.2 |
| J2 | $C_1$-$C_4$ | 18.3 | 14.3 | 12.4 | 12.2 | 11.1 |
| | n $C_7$ | — | — | — | — | — |
| | $C^+_5$ (other than n $C_7$) | 2.5 | 3.9 | 3.6 | 3.8 | 3.6 |
| | Aromatics (benzene + toluene) | 79.2 | 81.8 | 84.0 | 84.0 | 85.3 |

It is apparent from Table IV that catalysts which contain no tin give results closely similar to those obtained with a catalysts containing only platinum and alumina. With these catalysts, the percentage of hydrocarbons with four or fewer carbon atoms is particularly high.

On the other hand, the percentage of aromatic hydrocarbons obtained with the catalysts in accordance with the invention is about double that obtained with catalysts containing no tin. Catalyst C3, tested at 460° C., exhibits a remarkable activity, the percentage of aromatic hydrocarbons obtained being close to 70 wt. %.

Thus the catalysts in accordance with the invention are good hydroreforming catalysts.

EXAMPLE 2

In this example, a catalyst T2 consisting of alumina, platinum and tin is prepared.

This catalyst, along with catalysts B2 and D2, is then submitted to catalytic tests under hydrogen pressure.

PREPARATION OF CATALYST T2

100 g of the alumina carrier is immersed for 4 hours in 250 cc of a solution containing 20 cc of hydrochloric acid RP and 0.380 g of stannous chloride, $SnCl_2.2H_2O$. After drying at 120° C. for 16 hours and calcination for 2 hours, the alumina is immersed in 250 cc of an N/10 solution of hydrochloric acid which is circulated for 24 hours.

Following dewatering, the alumina is immersed for 16 hours in 250 cc of a hexachloroplatinic acid solution containing 0.350 g of platinum.

The impregnated alumina is then dried for 16 hours at 120° C. and calcined for 2 hours at 530° C.

The catalyst so prepared contains 0.35 wt. % of platinum, 0.20 wt. % of tin and 1.20 wt. % of chlorine.

CATALYTIC TEST 25 cc of catalyst is placed in a stainless-steel reactor. A pure and dry hydrogen stream is then passed over the catalyst for 2 hours, its temperature being maintained at about 500° C. and the pressure in the reactor being maintained at 7 bars. The charge consisting of normal heptane is then introduced at a space velocity per hour of 2 and a ratio of moles of hydrogen introduced to moles of normal heptane introduced of 5.

Samples taken from the reactor effluent permit determination, on the one hand, of the liquid yield, by simple weighing, and, on the other hand, of the equivalent octane number of the liquid, by applying to the chromatographic analyses of said liquid the ASTM blend numbers appearing in the graphs with which those skilled in the art are familiar.

The tests are performed at a fixed octane number, that is to say, as soon as a decrease in octane number is observed, the reactor temperature is raised in order to bring the octane number again to the level originally selected, which in this example is 103.

The variation of the reactor temperature as a function of time closely resembles a straight line whose slope is measured. The milder the slope of the straight line, the better the catalyst, as the temperature then needs to be adjusted only very slighly in the course of time to secure the desired octane number. The time required to reach the limiting temperature of use then is extended, which is a decided advantage in industrial applications.

Table V shows the results of the catalytic tests performed under pressure on catalysts T2, B2, and D2.

TABLE V

| CATALYSTS | INITIAL TEMPERATURE (°C.) | SLOPE OF CURVE T = f (time) |
|---|---|---|
| T2 | 520.5 | 0.0690 |
| B2 | 509.7 | 0.0324 |
| D2 | 499.2 | 0.0493 |

It is apparent from that table that for a given constant octane number (1) the initial temperature is lower for the catalysts B2 and D2 in accordance with the invention than for catalyst T2 which contains only alumina, platinum and tin, and (2) the slope of the curve is milder in the case of catalysts B2 and D2, which translates into less rapid degradation of the catalyst.

The catalysts in accordance with the invention thus exhibit better stability than a catalysts containing only alumina, platinum and tin.

EXAMPLE 3

This example illustrates the catalytic hydroreforming tests performed under pressure for about 200 hours on various catalysts in accordance with the invention which have been prepared by the impregnation techniques described in example 1.

The various catalytic compositions tested are summarized in Table VI, which also shows the composition of two control catalysts, T3 and T4, which contain only platinum and only platinum and tin, respectively, and have been prepared by the same impregnation techniques as the catalysts in accordance with the invention.

TABLE VI

| | Composition of Catalyst, wt. % | | | |
|---|---|---|---|---|
| CATA-LYST | Metal other than Platinum or tin | Platinum | Metal other than platinum or tin | Tin | Chlorine |
| T3 | — | 0.37 | — | | 0.97 |
| T4 | — | 0.37 | — | 0.21 | 0.86 |
| K | Cerium | 0.35 | 0.55 | 0.20 | 0.88 |
| L | " | 0.35 | 0.09 | 0.20 | 0.93 |
| M | " | 0.31 | 1.66 | 0.21 | 0.90 |
| N | Lanthanum | 0.36 | 0.05 | 0.20 | 1.26 |
| O | " | 0.36 | 0.06 | 0.21 | 0.92 |
| Q | Dysprosium | 0.36 | 0.10 | 0.20 | 0.93 |
| S | Yttrium | 0.36 | 0.03 | 0.23 | 1.04 |
| U | Thorium | 0.35 | 0.45 | 0.20 | 0.84 |
| V | Uranium | 0.36 | 0.29 | 0.21 | 0.85 |
| W | Praseodymium 0.37 | 0.04 | 0.22 | | 0.95 |
| X | Neodymium | 0.37 | 0.03 | 0.21 | 0.86 |
| Y | Gadolinium | 0.36 | 0.12 | 0.20 | 0.90 |
| Z | Samarium | 0.36 | 0.16 | 0.24 | 0.88 |

The catalytic test under pressure is similar to that described in example 2. The test conditions are as follows:

| | |
|---|---|
| Quantity of catalyst in the reactor | 25 cc |
| Pressure | 7 bars |
| Charge | n-heptane |
| Space velocity per hour (measured in the liquid state) | 2 |
| Molar ratio of hydrogen introduced to n-heptane introduced | 5 |
| Octane number selected | 103 |

All catalysts are reduced by a stream of pure hydrogen for several hours at 500° C. prior to introduction of the n-heptane.

The drops in octane number are compensated by a rise in the reaction temperature, as in example 2.

The results of these tests are reported in Table VII for a duration of about 200 hours. The table shows the equation of the curve representing the variation of temperature as a function of time as well as the average liquid yield, calculated for the entire duration of the test.

The liquid yield indicates the percentage of high-octane hydrocarbons with five or more carbon atoms contained in the effluent, exclusive of the unconverted normal heptane.

TABLE VII

| CATALYST | Initial Temperature | Slope of curve T = f (time) | Average liquid yield, % |
|---|---|---|---|
| T3 | 507 | 0.127 | *59.7−0.036 t |
| T4 | 514 | 0.073 | 59.4 |
| K | 515.5 | 0.010 | 56 |
| L | 504 | 0.066 | 58.9 |
| M | 507 | 0.098 | 59.0 |
| N | 508.8 | 0.039 | 57.4 |
| O | 511.4 | 0.063 | 59.0 |
| Q | 514 | 0.103 | 59.3 |
| S | 509.4 | 0.044 | 57.8 |
| U | 515.6 | 0.083 | 59.5 |
| V | 514.3 | 0.083 | 59.2 |
| W | 503.2 | 0.078 | 59.1 |
| X | 514.8 | 0.089 | 59.9 |
| Y | 514.3 | 0.081 | 58.6 |
| Z | 511 | 0.062 | 59.3 |

*With respect to this catalyst, a rather substantial drop in liquid yield with time was observed, which means that the stability of this catalyst is rather poor. (The liquid yield is expressed as a functon of time t.) For the other catalytic formulas, the liquid yield is stable with time, and it is apparent from this table that the catalysts in accordance with the invention compare favorably with the control catalysts prepared and tested under the same conditions.

EXAMPLE 4

In this example, the catalysts B1 and B2 prepared in example 1 are submitted to catalytic tests for isomerization of the ethylbenzene.

25 cc of catalyst is placed in a stainless-steel reactor, and a pure and dry hydrogen stream is passed over the catalyst for 2 hours, its temperature being maintained at about 435° C. and the pressure in the reactor being maintained at 10 bars. The charge consisting of ethylbenzene is then introduced at a space velocity per hour of 2 and a ratio of moles of hydrogen introduced to moles of ethylbenzene introduced of 3.

Samples taken from the reactor effluent permit determination, on the one hand, of the liquid yield, by simple weighing, and, on the other hand, of the yields of aromatic hydrocarbons, by chromatographic analysis of said liquid.

The results of the tests run on catalysts B1 and B2 are reported in Table VIII.

TABLE VIII

| Operating time (hours) | 3 | | 5 | | 7 | |
|---|---|---|---|---|---|---|
| Catalyst | 81 | 82 | 81 | 82 | 81 | 82 |
| Liquid yield (wt. %) | 100 | 96.8 | 100 | 92.4 | 96.53 | 100 |
| Ethylbenzene conversion (%) | 13.37 | 21.03 | 15.22 | 24.25 | 17.42 | 17.60 |
| Yield in wt. % of — Benzene | 1.43 | 1.06 | 1.22 | 0.92 | 0.95 | 1.10 |
| Toluene | 1.06 | 0.25 | 0.69 | 0.18 | 0.51 | 0.29 |
| Paraxylene | 1.93 | 3.47 | 2.72 | 3.06 | 2.71 | 3.34 |
| Metaxylene | 4.03 | 6.15 | 4.30 | 5.46 | 4.28 | 5.86 |
| Orthoxylene | 2.59 | 4.82 | 2.71 | 4.41 | 2.83 | 4.24 |
| Selectivity for xylene | 63.3 | 68.7 | 63.9 | 53.3 | 56.4 | 76.4 |

In this table, the selectivity for xylenes is the ratio of percent of xylenes formed to percent of ethylbenzene converted.

As may be seen from this table, catalyst B2 in accordance with the invention has greater activity and greater selectivity in the isomerization of ethylbenzene than catalyst B1 which contains no tin.

EXAMPLE 5

This example, like the preceding one, illustrates the utilization of catalysts in accordance with the invention in the isomerization of aromatic hydrocarbons.

In this example, the isomerization of ethylbenzene is carried out under the following conditions:

| | |
|---|---|
| Quantity of catalyst in the reactor | 40 cc |
| Pressure | 30 bars |
| Molar ratio of hydrogen introduced to ethylbenzene introduced | 5 |
| Space velocity per hour, measured in the liquid state | 2 |
| Reaction temperature | 450° C. |
| Duration of test | About 6 hr. |

For each catalyst tested, Table IX shows
the composition of the catalyst;
the ethylbenzene conversion (that is to say, the molar ratio of ethylbenzene converted to ethylbenzene introduced):
the selectivity for xylenes $S_x$ (molar ratio of xylenes produced to ethylbenzene converted);
The overall selectivity $$S_T = S_X + \frac{\text{precursors of xylenes produced}}{\text{ethylbenzene converted}},$$

the precursors of xylenes being intermediate products such as ethylcyclohexane, dimethylcyclohexanes, methylethylcyclopentanes, etc.; and

TABLE IX

| Composition of catalyst (Wt. %) | | | | conversion % | $S_x$ % | $S_T$ % |
|---|---|---|---|---|---|---|
| Platinum | Tin | Cerium | Chlorine | | | |
| *0.30 | — | — | 1.39 | 60.5 | 46.0 | 76.3 |
| *0.35 | 0.20 | — | 1.40 | 47.3 | 58.3 | 82.7 |
| 0.35 | 0.21 | 0.10 | 1.27 | 71.2 | 59.9 | 85.3 |
| 0.36 | 0.20 | 0.13 | 1.57 | 74.7 | 65.15 | 85.7 |
| 0.35 | 0.05 | 0.15 | 1.37 | 82.0 | 50.9 | 78.3 |
| 0.36 | 0.10 | 0.15 | 1.32 | 73.1 | 58.7 | 82.25 |
| 0.35 | 0.15 | 0.18 | 1.29 | 66.0 | 64.5 | 87.9 |
| *0.35 | — | 0.18 | 1.34 | 65.3 | 40.2 | 65.0 |
| 0.35 | 0.20 | 0.55 | 1.31 | 42.5 | 52.4 | 87.5 |
| 0.31 | 0.21 | 1.66 | 1.42 | 37.0 | 49.7 | 85.1 |

TABLE IX-continued

| Composition of catalyst (Wt. %) | | | | conversion % | $S_x$ % | $S_T$ % |
|---|---|---|---|---|---|---|
| Platinum | Tin | Cerium | Chlorine | | | |
| *0.32 | — | 1.95 | 1.39 | 51.35 | 44.2 | 73.5 |

*Control catalysts containing only platinum, or platinum and tin, or platinum and cerium prepared under the same conditions as the catalysts in accordance with the invention tested in this table.

The results presented in this table show that the catalysts in accordance with the invention are good catalysts for the isomerization of aromatic hydrocarbons. (Refer to the selectivities for xylenes $S_x$ or the overall selectivities $S_T$.)

We claim:

1. A method comprising use of a catalyst in the reforming, in the presence of hydrogen, of hydrocarbon fractions whose sulfur content is under 10 ppm and whose boiling temperature at atmospheric pressure is between 35° and 250° C., said catalyst comprising a refractory mineral oxide carrier, a halogen element present in combined form, and containing metals in a free or combined state on said carrier as follows:
   a. From 0.02 to 2% of at least one metal from the platinum group;
   b. From 0.02 to 2% of tin; and
   c. From 0.01 to 5% of at least one metal selected from the group consisting of scandium, yttrium, thorium, and uranium;
   said percentages, determined relative to the respective elemental form, being based upon the total catalyst weight.

2. A method according to claim 1, wherein said metal percentages comprise:
   a. From 0.10 to 0.70%;
   b. From 0.05 to 0.60%; and
   c. From 0.02 to 1%, respectively.

3. A method according to claim 1, wherein said carrier has a specific surface greater than 15 m² per gram and a specific pore volume greater than 0.1 cc per gram.

4. A method according to claim 3, wherein the halogen content of said catalyst is between 0.5 and 3%.

5. A method according to claim 4, wherein the platinum-group metal is platinum.

6. A method according to claim 5, wherein the carrier is alumina whose specific surface is between 15 and 350 m² per gram.

7. A method according to claim 6, wherein said carrier is substantially acid in character giving it acid sites which favor isomerization.

8. A method according to claim 6, wherein said halogen is chlorine.

9. A method according to claim 8, wherein said halogen content, based on the total catalyst weight, is between 0.6 and 1.6%.

10. A method according to claim 1, wherein said metal percentages comprise:
   a. From 0.10 to 0.70%;
   b. From 0.05 to 0.60%; and
   c. From 0.02 to 1%;
respectively; said carrier has a specific surface greater than 15 m² per gram and a specific pore volume greater than 0.1 cc per gram; and said platinum-group metal is platinum.

11. A method according to claims 1 or 10, wherein said reforming is in the presence of hydrogen, of hydrocarbon fractions whose sulfur content is under 1 ppm and whose boiling temperature at atmospheric pressure is between 35° and 250° C.

12. A method comprising use of a catalyst in the isomerization of hydrocarbons in the presence of hydrogen, said catalyst comprising a refractory mineral oxide carrier, a halogen element present in combined form, and containing metals in a free or combined state on said carrier as follows:

a. From 0.02 to 2% of at least one metal from the platinum group;
b. From 0.02 to 2% of tin; and
c. From 0.01 to 5% of at least one metal selected from the group consisting of scandium, yttrium, thorium, and uranium;

said percentages, determined relative to the respective elemental form, being based upon the total catalyst weight.

* * * * *